US008601800B2

(12) United States Patent
Ojima

(10) Patent No.: US 8,601,800 B2
(45) Date of Patent: Dec. 10, 2013

(54) GREEN MUFFLER

(76) Inventor: Akinobu Ojima, Burbank, CA (US)

( * ) Notice: Subject to any disclaimer, the term of this patent is extended or adjusted under 35 U.S.C. 154(b) by 289 days.

(21) Appl. No.: 12/925,641

(22) Filed: Oct. 26, 2010

(65) Prior Publication Data

US 2011/0099986 A1    May 5, 2011

Related U.S. Application Data

(60) Provisional application No. 61/280,307, filed on Nov. 2, 2009.

(51) Int. Cl.
*F01N 3/04* (2006.01)

(52) U.S. Cl.
USPC .................. 60/310; 60/279; 60/281; 60/295; 60/297; 60/309; 60/311; 60/317; 60/319; 95/151; 95/189; 95/200

(58) Field of Classification Search
USPC ........... 60/274, 279, 281, 295, 297, 298, 310, 60/311, 315, 316, 317, 318, 320, 309; 95/150, 151, 188, 189, 199, 200
See application file for complete search history.

(56) References Cited

U.S. PATENT DOCUMENTS

| | | | | |
|---|---|---|---|---|
| 3,718,733 A | * | 2/1973 | Gehri | 423/213.2 |
| 3,742,682 A | * | 7/1973 | Ligutom | 96/265 |
| 3,768,981 A | * | 10/1973 | Alliger | 422/171 |
| 4,300,924 A | * | 11/1981 | Coyle | 96/247 |
| 4,399,107 A | * | 8/1983 | Bose | 422/170 |
| 6,240,725 B1 | * | 6/2001 | Scappatura | 60/311 |
| 7,065,962 B2 | * | 6/2006 | Boncodin | 60/310 |

* cited by examiner

*Primary Examiner* — Binh Q Tran
(74) *Attorney, Agent, or Firm* — Ruth Eure

(57) ABSTRACT

The present invention provides an automotive exhaust system that removes harmful contaminants from engine exhaust and thus reduces air pollution, presents a number of distinct and significant benefits and advantages. Foremost, the Green Muffler subjects engine exhaust gases to a two-stage cleansing and purification process, first scrubbing the gases in a recirculating air-and-water bath; and then combining the remnant gases with an air-freshening chemical before release to the atmosphere. The Green Muffler, then, serves to lower a vehicle's carbon-dioxide and carbon-monoxide emissions and thereby reduces the level of air pollution and atmospheric warming due to car exhaust. Further, the Green Muffler reduces the temperature of vehicle exhaust, another plus for the planet.

1 Claim, 2 Drawing Sheets

GREEN MUFFLER

CLAIM OF PRIORITY

This patent application claims priority under 35 USC 119 (e)(1) from U.S. Provisional Patent Application Ser. No. 61/280,307 filed Nov. 2, 2009, of common inventorship herewith entitled, "Green Muffler."

FIELD OF THE INVENTION

The present invention pertains to the field of engine exhaust and muffler systems for internal combustion engines.

BACKGROUND OF THE INVENTION

The prior art has put forth several designs for treatment of engine exhaust. Among these are:

U.S. Pat. No. 4,783,958 to Antonio B. Borja describes an exhaust gas processing device and method comprising a series of portions for passage of exhaust gas wherein the first portion receives the gas and a liquid that is vaporized to coagulate particulate matter in the gas, the second portion comprises filters and the third portion having a liquid reservoir.

U.S. Pat. No. 6,402,816 to Gordon S. Trivett and D. Andrew Trivett describes a gas scrubber comprising a tank of scrubbing liquid into which a downconer pipe feeds inlet gas and fresh scrubbing liquid from a plenum.

U.S. Pat. No. 6,616,733 to Roy J. Pellegrin describes a method and means for filtering an air stream with an aqueous froth.

U.S. Pat. No. 7,163,571 to Ying Gang Ruan describes an exhaust gas cooler and particulate scrubbing system comprising an intercooler.

None of these prior art references describe the present invention.

SUMMARY OF THE INVENTION

It is an object of the present invention to provide an improved method for cleaning an engine's exhaust.

DETAILED DESCRIPTION

Figure 1:
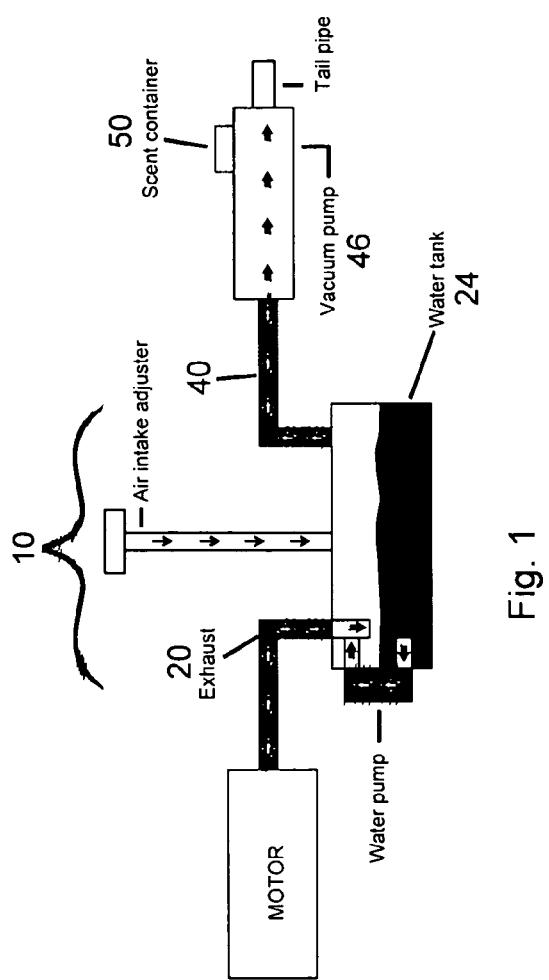
FIG. 1 is a schematic showing the relative position of the elements of the present invention.
Figure 2:
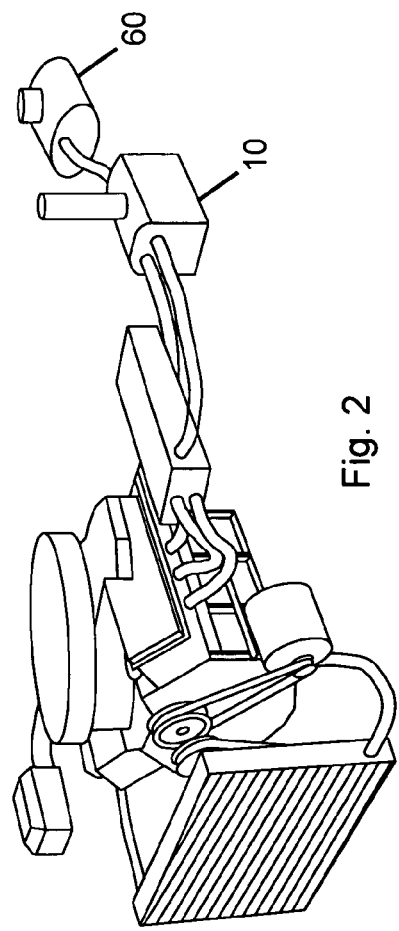
FIG. 2 is a diagram showing the placement of the present invention on an engine.
Figure 3:
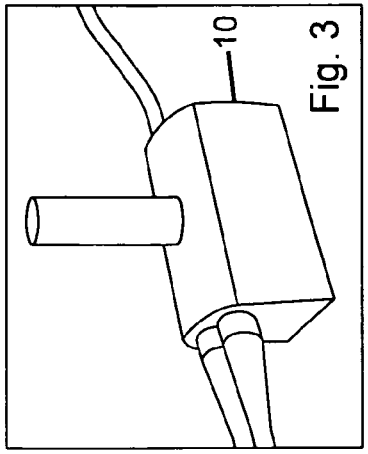
FIG. 3 shows the present invention in the exhaust system of an engine.
Figure 4:
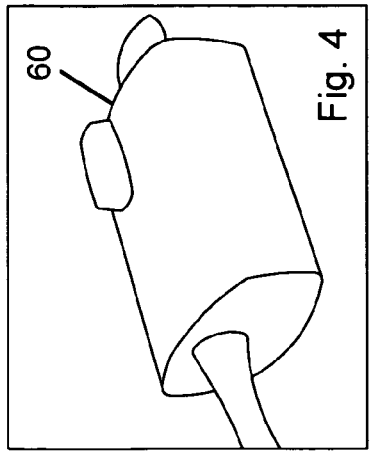
FIG. 4 shows a muffler on the exhaust pipe of an engine.
Figure 5:
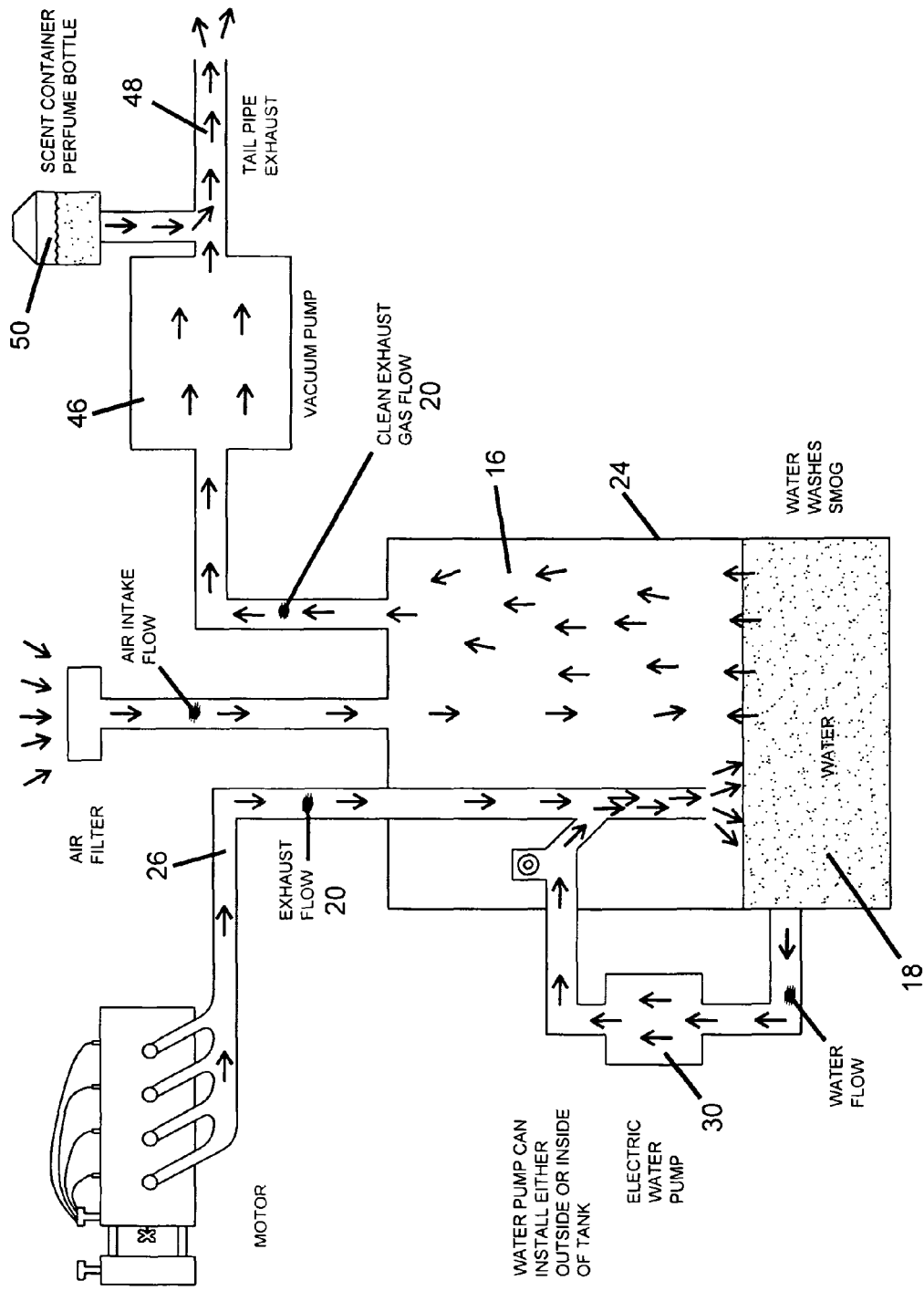
FIG. 5 is a schematic diagram of the present invention.

The industrialized and industrializing world continues to belch carbon-dioxide, the culprit most often identified with global warming, produced by the combustion of coal and oil, and the exhaust emissions of cars, into the atmosphere. Therefore, we must reduce our carbon-dioxide emissions for the sustainability of the planet. When we wonder what we can do as individuals to help with such enormous problems, we can adopt technologies that result in cleaner vehicles and lower air pollution. One such technology is provided by the present invention.

Recognizing the potential to create a cleaner, more efficient exhaust system for motor vehicle engines, the present invention, hereinafter referred to as the Green Muffler, was developed. Simply stated, the Green Muffler is an exhaust-and-muffler system for the internal-combustion engines of motor vehicles, the intent being to cleanse, cool, and even scent the vehicle's exhaust before it leaves the tailpipe. The Green Muffler is manufactured by the Motor Vehicle Parts and Accessories industry, Standard Industrial Code 3714. The Green Muffler 10 intercedes between the engine's exhaust manifold, catalytic converter, and the vehicle's tailpipe, and constitutes a complete system for cleaning and purifying the engine's exhaust, cooling it, and then releasing it into the atmosphere as a relatively benign gas. Upon leaving the engine manifold and catalytic converter, the exhaust gases 20 are forced down an exhaust pipe 26, with this pipe emptying into a tank or reservoir 24 half-filled with water 18. Now this reservoir 24 is equipped with a recirculating pump 30, such that water is constantly being pulled out of the reservoir 24 and recirculated back into the reservoir 24 via the same pipe 20 the exhaust gases 20 are entering through. The intended effect of this continual washing or scrubbing cycle is to remove contaminants from the exhaust gases 20. The scrubbed exhaust gases 40 are then pulled from the air chamber 16 of the reservoir 24, by a vacuum pump 46, back into the exiting exhaust pipe 48, where a standard muffler 60 is installed to dampen the engine's sound. Finally, adjacent to the tailpipe itself, a second reservoir and pump blends a cooled, air-freshening chemical 50 with the remnant exhaust gases, which are then released into the atmosphere, cleaned, safe, and freshly scented.

The Green Muffler, an automotive exhaust system that removes harmful contaminants from engine exhaust and thus reduces air pollution, presents a number of distinct and significant benefits and advantages. Foremost, the Green Muffler subjects engine exhaust gases to a two-stage cleansing and purification process, first scrubbing the gases in a recirculating air-and-water bath; and then combining the remnant gases with an air-freshening chemical before release to the atmosphere. The Green Muffler, then, serves to lower a vehicle's carbon-dioxide and carbon-monoxide emissions and thereby reduces the level of air pollution and atmospheric warming due to car exhaust. Further, the Green Muffler reduces the temperature of vehicle exhaust, another plus for the planet. The Green Muffler technology can presumably be introduced into the design not only of automobile and truck motors, but also to lawnmowers, generators, motorcycles, virtually any machine relying on an internal-combustion engine. Clean, quiet, and environmentally friendly, the Green Muffler was conceived with a cleaner, healthier planet in mind, and will strongly appeal not only to consumers, but also to the manufacturers of motor vehicles and other gas- or diesel-powered machines. An engine-exhaust and muffler system for internal combustion engines, the Green Muffler results in lower, cleaner exhaust emissions from equipped engines. Cleverly conceived and thoughtfully designed, the Green Muffler can be incorporated into the manufacture of automobile and truck engines, as well as a wide variety of vehicles and machines which rely on internal-combustion engines for their motive force. The Green Muffler will appeal strongly to consumer households and motoring public, as well as to the motor vehicle and small-engine manufacturing sector.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. An improved device for cleaning the exhaust from an internal combustion engine comprising a device mounted between the engine's exhaust manifold, catalytic converter, and the vehicle's tailpipe, and constitutes a complete system for cleaning and purifying the engine's exhaust, cooling it, and then releasing it into the atmosphere as a relatively benign gas, wherein exhaust gases leave the engine manifold and catalytic converter, and the exhaust gases are forced down an exhaust pipe, with this exhaust pipe emptying into a tank or reservoir half-filled with water, wherein the reservoir is equipped with a recirculating pump, such that water is constantly being pulled out of the reservoir and recirculated back into the reservoir by means of the same pipe the exhaust gases are entering through thus creating scrubbed gases, and wherein the effect of this continual washing or scrubbing cycle is to remove contaminants from the exhaust gases, and wherein the scrubbed exhaust gases are then pulled from the air chamber of the reservoir, by a vacuum pump, back into the exiting exhaust pipe, where a standard muffler is installed to dampen the engine's sound, and further comprising a reservoir and pump blends a cooled, air-freshening chemical with the remnant exhaust gases, which are then released into the atmosphere, cleaned, safe, and freshly scented.

\* \* \* \* \*